Nov. 7, 1967 J. O. HAMBY ETAL 3,351,761

FM LIGHT COMMUNICATIONS SYSTEM

Filed July 9, 1962 5 Sheets-Sheet 1

WITNESSES

John E. Healy, Jr.

William L. Gates

INVENTORS
Roland H. Chase &
Jefferson O. Hamby
BY Ernest P. Klipfel
ATTORNEY

3,351,761
FM LIGHT COMMUNICATIONS SYSTEM

Jefferson O. Hamby, Baltimore, and Roland H. Chase, Carrollton, Md., assignors to Westinghouse Electric Corporation, Pittsburgh, Pa., a corporation of Pennsylvania Filed July 9, 1962, Ser. No. 208,245
2 Claims. (Cl. 250—199)

This invention relates to communications systems and more particularly relates to a communications system which operates in the optical region of the electromagnetic spectrum.

Although a variety of systems have been developed in the past, they have all had one point in common, that is, they are amplitude modulation systems operating on the principle of varying the intensity of the transmitted light with the applied signal information.

It is an object of the present invention to provide a new and improved optical communications system.

A further object of the present invention is to provide an optical communication system which carries intelligence by means of a modulated light beam where frequency spectrum is varied in accordance with the intelligence signal.

Still another object of the present invention is to provide a new and unique method and apparatus for communication in the ultraviolet, visible and infrared regions of the electromagnetic spectrum wherein the optical source is frequency modulated while maintaining a constant intensity.

Other objects and advantages will become apparent after a study of the following specification when read in connection with the accompanying drawings, in which.

Figure 1:
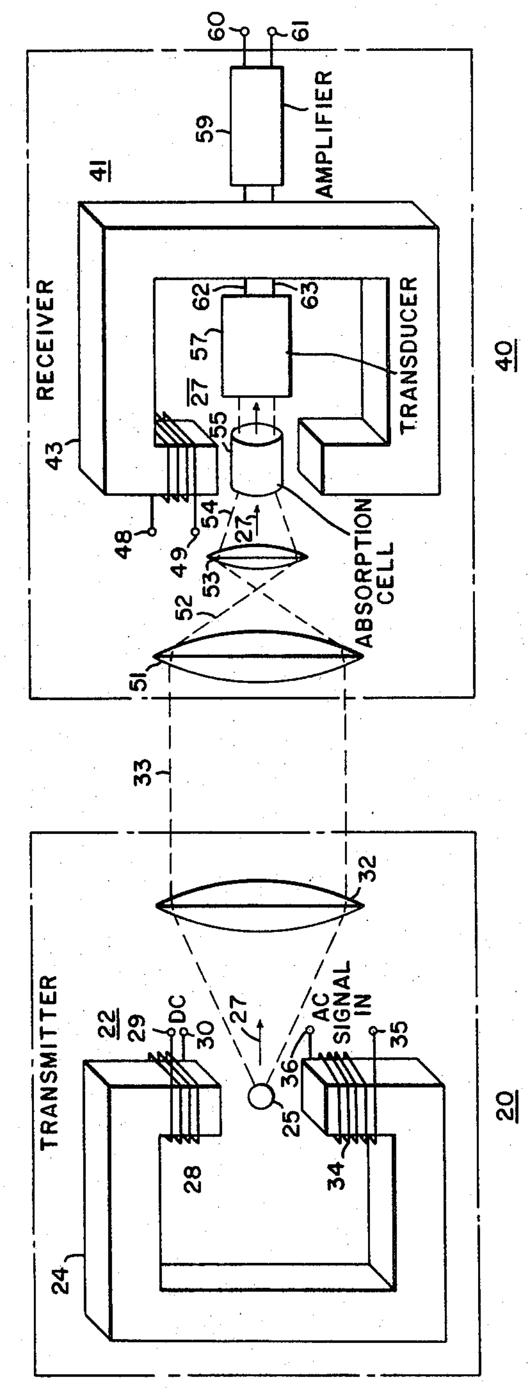
FIGURE 1 is a diagrammatic view of a first embodiment of the invention.

A new and unique solution to the problem of optical communications is realized by frequency modulating the spectral source of radiation. This invention provides a means of communication wherein the frequency of the emitted radiation is a function of the intelligence being transmitted. This system is based upon two physical phenomena; first, the spectral emittance and absorption and characteristics of an atomic particle in its ground state and, second, its "space quantization" when either the optical source of absorbing center is under the influence of either a magnetic or electric field.

In 1896 Pieter Zeeman successfully demonstrated that an optical source having known spectral lines could be split into a number of components by application of a magnetic field. This phenomenon is called the Zeeman effect. In the simplest case, when the optical source is viewed along the direction of the field, a selected spectral line will be seen as two separate component lines symmetrically displaced from the original spectral line, the two components or sidebands being circularly polarized in opposite directions; and when viewed at right angles to the field three component lines appear, one central line at the location of the original line and two outside lines symmetrically displaced from the central line, the outside components being plane polarized parallel to the field and the central one being plane polarized at right angles to the field. The number of lines into which the source is split varies with the source material, however, the lines are all symmetrically arranged and polarized as indicated.

Following Zeeman's discovery of the splitting up of the spectral lines in a magnetic field, many attempts were made to observe an analogous effect due to an external electric field. In 1913 Stark observed that when the hydrogen spectrum is excited in a strong electric field, each spectral line split into a symmetrical pattern. When viewed perpendicular to the electric field some of the components of each line pattern are observed to be plane polarized with the electric vector parallel to the field and the others plane polarized with the electric vector normal to the field. When viewed parallel to the field only unpolarized light is observed. This phenomenon is likewise called the Stark effect and is analogous to the Zeeman effect.

As the Zeeman effect is obtained by placing an optical source within a magnetic field the inverse Zeeman effect is observed when light is passed through an absorption medium located in a magnetic field. Likewise, an inverse Stark effect is noted when light is passed through an absorption medium which is located in an electric field. For a more detailed treatment of the Zeeman and Stark effects with the inverse Zeeman effect and the inverse Stark effect, attention is directed to Fundamentals of Optics, Jenkins and White, second edition, 1950, McGraw-Hill Book Co., chapter 29, pages 589–606.

In view of the Zeeman and Stark effects previously described, the present invention generally utilizes the phenomenon of the splitting of the spectral lines of an optical source containing for example, mercury or sodium into components while in the presence of an electric or magnetic field and apparatus is provided to modulate and demodulate the frequency or wavelength of the emitted optical energy instead of the amplitude as provided by the prior art. This is accomplished by employing the intelligence signal to be communicated to modulate the strength of the field surrounding a spectral source, causing corresponding small wavelength or frequency shifts in the transmitted signal. This transmitted FM signal is picked up by an optical receiver having a frequency sensitive demodulator which translates the FM light into amplitude or intensity modulated optical energy by means of an absorption device acting as a type of frequency modulation or FM discriminator.

For the purposes of illustration, the system will be described utilizing the Zeeman frequency shift effect. It is to be understood however that the Stark effect can be utilized to the same advantage.

In applying the Zeeman effect to the subject invention, the modulation is produced in an optical transmitter by first subjecting a spectral source to a uniform magnetic field, thus establishing a steady state tuning condition. This field, due to the Zeeman effect induces in the radiant flux of the spectral source, an infinitesimal wave number or frequency shift which can be considered the center frequency of the transmitted signal. An intelligence carrying current is then produced from the intelligence input signal to superimpose a modulating field, causing further frequency shifts about the center frequency. The resultant radiation is projected in a preselected solid angle, collected and condensed by an optical system in a receiving unit and passed through a separation filter which rejects all but the frequencies of interest. Part of the radiation passing the filter impinges directly on an absorption cell. The absorption cell contains atoms of the same type as the spectral source, i.e., if the spectral source contains mercury of a particular type, the cell must also have the identical substance contained therein. The absorption cell is situated in a uniform magnetic field tuned to the center frequency of the transmitted energy, resulting in an inverse Zeeman effect which attenuates the radiation at the center frequency. This uniform magnetic field may vary from zero upward depending on the steady state magnetic field employed in the transmitter. The output of the absorption cell is light which is amplitude or intensity modulated in accordance with the intelligence input signal. By employing suitable optical to electrical transducer means the amplitude modulated light is transformed into an electrical signal corresponding to the intelligence carrying current used to modulate the field in the transmitter. By means of suitable utilization apparatus connected to the transducer the communications link is complete.

Referring more particularly to the drawings, FIGURE 1 shows, according to the first embodiment, an optical transmitter unit 20 and an optical receiver unit 40. In the transmitter 20, an optical source 25 is located in a magnetic field H comprising both direct current and alternating current signal components provided by the optical frequency modulator 22. The modulator 22 includes a magnetic core 24 having wound around opposite legs windings 28 and 34. These windings can be wound on the same leg and even interwound with one another. The magnetic field comprising the direct current component used to tune the transmitter 20 is provided by a steady state or direct current potential applied to winding 28 across the terminals 29 and 30. The alternating current component of the magnetic field is produced by the alternating current signal comprising the intelligence to be transmitted and is applied to winding 34 across the input terminals 35 and 36. The optical or spectral source 25 provides transverse radiation 27 to a focussing and directing means comprising suitable optics such as a lens 32 which transmits a light beam 33 in a solid angle to the receiver 40.

The receiver includes a lens system comprising lenses 51 and 53 or other optical receptive means that collects and condenses the radiant flux in the light beam 33 from the transmitter, filters out undesirable radiation and directs the remaining energy into an optical frequency demodulator 41 having an adsorption cell 55 located therein which is sensitive to frequency and can detect the frequency shift occurring in the radiant flux due to the frequency modulation of the optical source at the transmitter 20. The absorption cell is located within a uniform magnetic field produced by the optical frequency demodulator 41 which is comprised of a magnetic core 43 with a D.C. winding 47 wound thereon and having terminals 48 and 49 for the application of a D.C. or steady state tuning voltage. As has already been stated this uniform magnetic field is variable from zero upward depending on the steady state magnetic field employed in the transmitter 20. The absorption cell 55, moreover, contains atoms of the same type, i.e. having the same atomic structure as the transmission source 25 in the transmitter 20. The receiver 40 also includes an optical to electrical transducer 57 located behind the absorption cell 55. The FM optical beam 54 which enters the cell 55 emerges as intensity modulated light $\overline{27}$ and as such strikes the transducer 57 to produce an electrical signal corresponding to the intelligence input signal transmitted. Connected to the output of the transducer 57 by means of leads 62 and 63 is an amplifier means 59 which amplifies the electrical signal thus produced and provides an output signal which appears at terminals 60 and 61.

For a fuller understanding of the frequency modulation optical communication system comprising the subject invention, the optical frequency modulator 22 and demodulator 41 will be considered in more detail including the corresponding spectral and polarization characteristics resulting therefrom.

Figure 2:
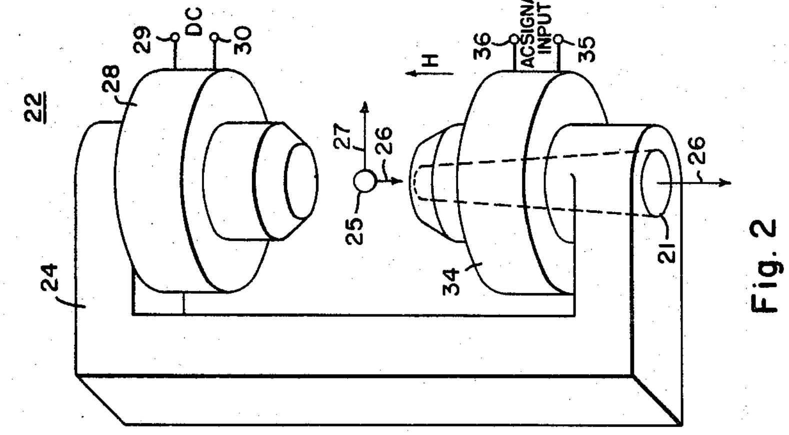
FIG. 2 is an illustrative diagram of an optical frequency modulator utilized in the embodiment shown in FIG. 1.

FIG. 2 illustrates more fully the optical frequency modulator 22 employed in the first embodiment shown in FIG. 1, but including structural details not shown therein. For purposes of clarity, like components have been designated with the same reference characters. The optical modulator 22, as illustrated before, has a magnetic core 24 upon which is wound a first winding 28 which has two terminals 29 and 30 for the application of the predetermined D.C. or steady state tuning voltage. A second winding 34 is located on the opposite leg of the core 24 and has two terminals 35 and 36 for the application of the intelligence A.C. input signal. The resulting magnetic field from the D.C. winding and the A.C. input signal is shown as the vector H. Situated between the two windings 28 and 34 is a spectral source 25 comprised of a gas discharge tube containing mercury or sodium which is excited by a microwave source, or it could be accomplished by using an optical maser. The spectral source 25 radiates light substantially in all directions, however, the light radiated longitudinally and transverse to the magnetic field H and shown as light beam 26 and the light beam 27, respectively, will be considered in detail. The light 27 radiating transverse to the magnetic field is shown radiating in an outward direction whereas the light radiated longitudinally to the magnetic field passes through a portion of the magnet 24 through the opening 21. The magnetic field having the D.C. and A.C. components changes the frequency of the emitted radiation in accordance with the Zeeman effect previously described. While the actual frequency change or shift is independent of the relation between the field orientation of the magnetic field H and the direction of observation, that is, whether the light is detected as that radiated transverse to the spectral source 25 or is detected as light 26 radiated longitudinally to the magnetic field H, the spectral distribution and polarization characteristics are highly dependent upon it.

Figure 3:
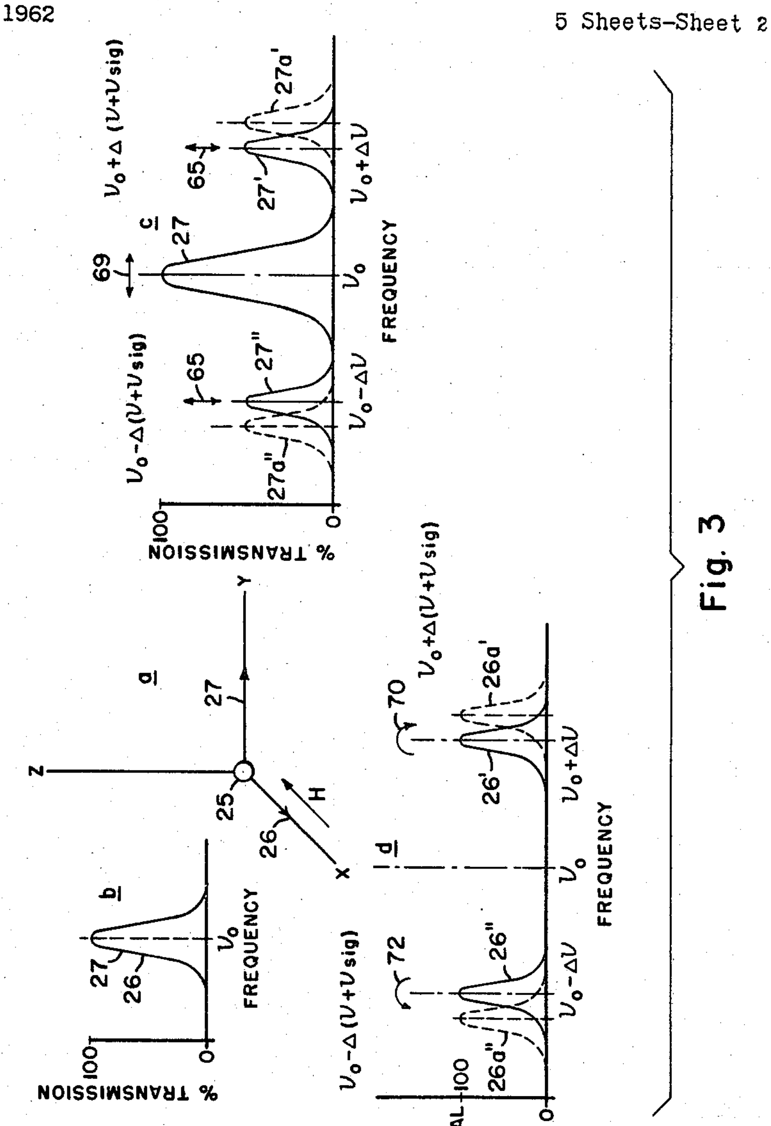
FIG. 3 is a set of curves more fully explaining the operation of the optical frequency modulator shown in FIG. 2.

FIGURE 3 illustrates the spectral distribution associated with an optical source 25 located in a magnetic field H. Curve *a* illustrates the position from which the optical or spectral source 25 should be observed to note the Zeeman effect when the spectral source is located in a magnetic field H. According to FIGURE 3 the spectral or optical source 25 is located at the intersection of the X, Y, Z axes in Cartesian coordinates. As shown, light 27 radiated transverse to the magnetic field H is radiated along the Y axis while light 26 radiated longitudinally with or parallel to the magnetic field emanates from the spectral source along the X axis.

If the spectral source 25 is observed in the absence of any magnetic field, the line spectrum of the source 25 will appear as curve *b* in FIG. 3. The spectral distribution both in the transverse and longitudinal direction is the same, having a peak power radiated at the base frequency $\nu_0$.

Also, the polarization is exactly the same regardless of the point of observation, that is, whether the source is observed along the Y axis or the X axis as shown in curve *a*.

When a static magnetic field is established by means of applying a predetermined D.C. bias voltage across terminals 29 and 30 of the coil 28, the spectral distribution and polarization characteristic along the transverse and longitudinal axis as shown in curve *a* changes in accordance with the Zeeman effect. Observing the spectral source in the presence of the static D.C. field along the transverse or Y axis presents a spectral distribution of the source as illustrated in curve *c* of FIG. 3. The light energy 27 from the spectral source 25 is now split into three components, wherein one component is located at the base frequency $\nu_0$, the natural frequency of the source; however, the light energy 27 radiating at the frequency $\nu_0$ is now horizontally polarized as shown by the arrow 69. In addition to the horizontally polarized light component 27 are two smaller components symmetrically located on each side of the base frequency $\nu_0$, the first component 27' occurring at the frequency $\nu_0+\Delta\nu$ and the second component 27'' occurring at $\nu_0-\Delta\nu$. These two symmetrical components 27' and 27'' moreover are now vertically polarized as indicated by the vertical arrow 65.

The light 26 emanating from the spectral source 25 if observed along the longitudinal or X axis of the curve *a*, which is parallel with the magnetic field, is split into two symmetrical components when the magnetic field is applied. Observing curve *d* of FIG. 3, it is seen that the line at $\nu_0$ disappears and the symmetrical components 26' and 26'' appear separated from the base frequency $\nu_0$ at $\nu_0+\Delta\nu$ and $\nu_0-\Delta\nu$, respectively. Also, in accordance with the Zeeman effect the light component 26' is circularly polarized in a clockwise direction as indicated by arrow 70; likewise, component 26'' is circularly polarized in the opposite direction or counterclockwise as indicated by the arrow 72.

The heart of the subject invention lies in the addition of an A.C. input signal modifying the magnetic field H in accordance therewith providing an alternating A.C. component to the magnetic field. The A.C. signal applied to terminals 35 and 36 provide the variable or modulating field causing the respective components of the light source 25 to be shifted back and forth about the steady state frequencies of $\nu_0+\Delta\nu$ and $\nu_0-\Delta\nu$. These frequencies become the center frequencies of the information channel. This is shown by the curves *c* and *d* of FIG. 3. As previously stated, curve *c* is the representation of the spectrum when observed when the light emitted transverse to the spectral force is observed. Under the influence of the modulating field produced by the A.C. input signal the components 27' and 27'' are shifted to the position shown as **27*a'* and 27*a''*, respectively, located at $\nu_0+\Delta(\nu+\nu_{sig})$ and $\nu_0-\Delta(\nu+\nu_{sig})$. Observing the light 26 radiated parallel or longitudinally to the magnetic field H, the components 26' and 26'' become 26*a'* and 26*a''*** located at the frequencies $\nu_0+\Delta(\nu+\nu_{sig})$ and $\nu_0-\Delta(\nu+\nu_{sig})$.

The frequency shift can be calculated by the classical Zeeman equation:

$$\Delta\nu=eH/4\pi mc=1.40\times10^6H \text{ sec.}^{-1}$$

where H equals the magnetic field in gauss, *e* the change on the electron in electrostatic units, *c* is the velocity of light, and *m* is the mass of the electrons in grams.

In summation, therefore, the optical modulator first provides a magnetic static field thus establishing a fixed frequency shift $\Delta\nu$ and in so doing creates two new frequencies, $\nu_0\pm\Delta\nu$, which become the center frequencies of the information channel. Superimposed on this static field is a variable field produced by the A.C. input signal of the intelligence to be transmitted. These fields provide a total field resulting in a change in the frequency shift which is modulated in accordance with the input signal. Thus, if the variable field is modulated as a function of the intelligence being transmitted the optical energy radiated is frequency modulated.

Figure 4:
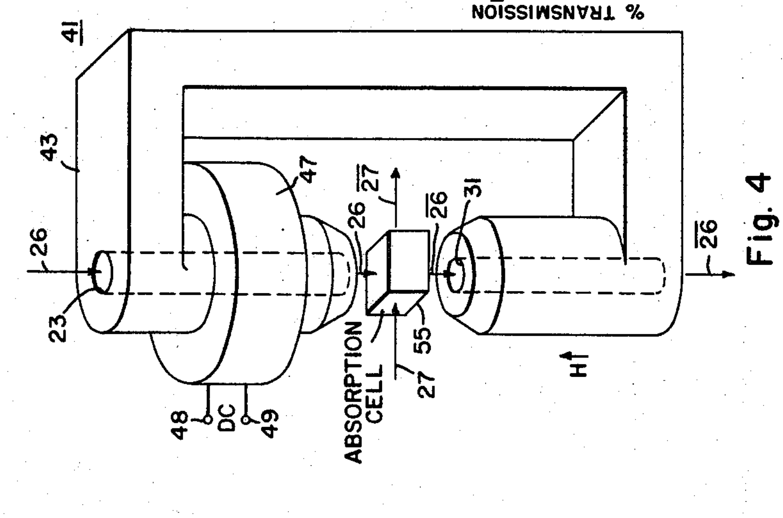
FIG. 4 is an illustrative diagram of an optical frequency demodulator utilized in the illustrative embodiment shown in FIG. 1.

The optical frequency demodulator 41 is apparatus to perform the inverse function of the optical frequency modulator 22 in order to regain the intelligence signal being transmitted from the transmitter 20. FIG. 4 shows in greater detail the optical frequency demodulator utilized in the preferred embodiment of FIG. 1. The optical frequency demodulator 41 is similar to the modulator 22 in that it has a magnetic core 43, but differs with regard to the modulator, in that only a single winding 47 is wound thereon. The winding 47 has two input terminals 48 and 49 where a D.C. or steady state value of bias voltage can be applied to tune the demodulator. In order to provide frequency demodulation of the light beam 33 radiated from the transmitter 20, a spectral absorption means, for example an absorption cell 55 containing a gas vapor such as a mercury or sodium vapor cell, but necessarily having atoms of the same type as the transmission spectral source 25. The cell acts as an extremely narrow high attenuation filter at those specific frequencies or wave lengths at which the cell exhibits resonants absorption characteristics. When the emission from the spectral source 25 is passed through the absorption cell 55 containing the same gas as the transmission source, the line will be very strongly attenuated.

Figure 5:
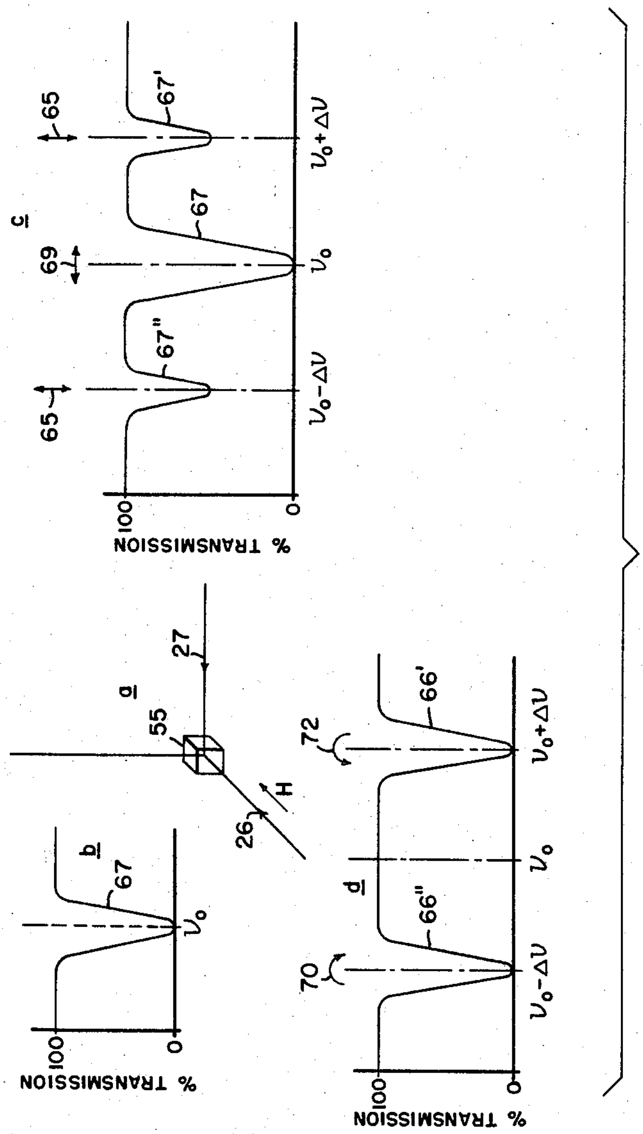
FIG. 5 is an illustrative set of curves more fully explaining the operation of the optical frequency demodulator shown in FIG. 4.

The characteristics of the absorption cell in the absence of and in the presence of a magnetic field is illustrated by reference to FIG. 5. When the absorption cell 55 is located within a magnetic field of the same magnitude as the transmitter field, the absorption spectrum is similar to, but the inverse of the radiation spectrum. Curve *a* of FIG. 5 illustrates the location of the absorption cell 55 at the interesection of the X, Y and Z axis in Cartesian coordinates and having light beam 27, which was radiated transverse to the magnetic field in the optical frequency modulator 22, passing through the absorption cell transverse to the magnetic field H along the Y axis. Light 26 radiated longitudinally with respect to the magnetic field of the optical frequency modulators 22 is directed toward the absorption cell 55 parallel to the magnetic field of the optical demodulator along the X axis.

Curve *b* of FIG. 5 illustrates the absorption characteristic of the absorption cell 55 having the same absorbing medium as the transmission source in absence of a magnetic field. It will be observed that the absorption spectrum curve 67 dips and has its maximum absorption at the center frequency $\nu_0$, the center frequency of the transmitting optical source 25.

By the application of a predetermined D.C. voltage across the terminals 48 and 49, the absorption spectrum splits into three components. By suitable adjustment of the magnetic field H the absorption spectrum can be tuned so that the absorption and radiation characteristics of the demodulator 41 and modulator 22 coincide. Curve *c* of FIG. 5 illustrates the absorption spectrum for energy passed through the absorption cell 55 transverse to the magnetic field H. According to curve *c* the main dip 67 in the absorption characteristic occurs at $\nu_0$ and is horizontally polarized as indicated by the arrow 69 and two symmetrical side components 67' and 67'' occur at $\nu_0+\Delta\nu$ and $\nu_0-\Delta\nu$, respectively, and are vertically polarized as indicated by the arrows 65.

Likewise a magnetic field affects the absorption spectrum of the absorption cell 55 for radiation passing through the absorption medium parallel or longitudinally with respect to the magnetic field H. The absorption spectrum thus formed appears as curve *d* of FIG. 5, providing two dips 66' and 66'' spaced symmetrically about the center frequency $\nu_0$ at $\nu_0+\Delta\nu$ and $\nu_0-\Delta\nu$, respectively; however, the absorption spectrum is oppositely polarized from the transmission spectrum in that the dip 66' is circularly polarized counterclockwise as shown by arrows 72 and the dip 66'' is circularly polarized in a clockwise direction as indicated by arrow 70.

Demodulation is accomplished by passing the received radiation through the absorption cell 55 where a percentage of the incident light energy 26 is lost. The percent transmission or the intensity of the light $\overline{26}$ leaving the cell is a function of the incident energy and the desired absorption frequency. Thus a particular frequency of light is converted into a particular percent transmission or intensity depending on the tuning of the absorption cell.

Figure 6:
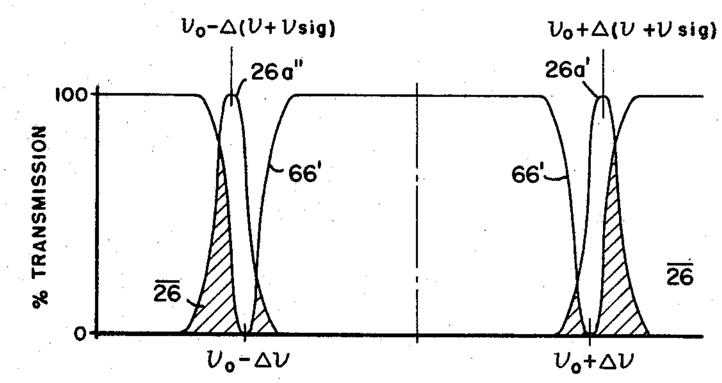
FIG. 6 is an illustrative diagram more fully illustrating the operation of the optical frequency demodulator to convert frequency modulated light to amplitude or intensity modulated light.

The manner in which the optical frequency modulator 22 and the optical demodulator 41 is combined to effect a communications link is further illustrated by FIG. 6 which shows the combined radiation and absorption characteristics for light which is radiated and absorbed parallel or longitudinal with the magnetic field. It is observed that the absorption curve is tuned to the base frequency $\nu_0$ and the maximum absorption points 66' and 66'' occur at $\nu_0 \pm \Delta\nu$, the center frequencies of the communication channel. The radiated light 26a' and 26a'' has an additional frequency shift due to the presence of a modulating or intelligence signal. Had no modulating signal been present substantially all of the transmitted energy would be absorbed in the absorption filter due to the fact that both centers would be located at the respective frequencies of $\nu_0 \pm \Delta\nu$. Since there is a slight frequency shift due to $\nu_{sig}$ an output light corresponding to $\overline{26}$ emerges from the absorption cell 65.

In summation, the output of the absorption cell 55 is light which is intensity or amplitude modulated in accordance with the frequency shift which has been produced by the A.C. intelligence input signal applied to the transmitter modulator 41. The intensity or amplitude modulated light is further converted to an electrical signal by means of an optical-to-electrical transducer 57 such as a photo-multiplier tube placed at the output of the absorption filter.

Figure 10:
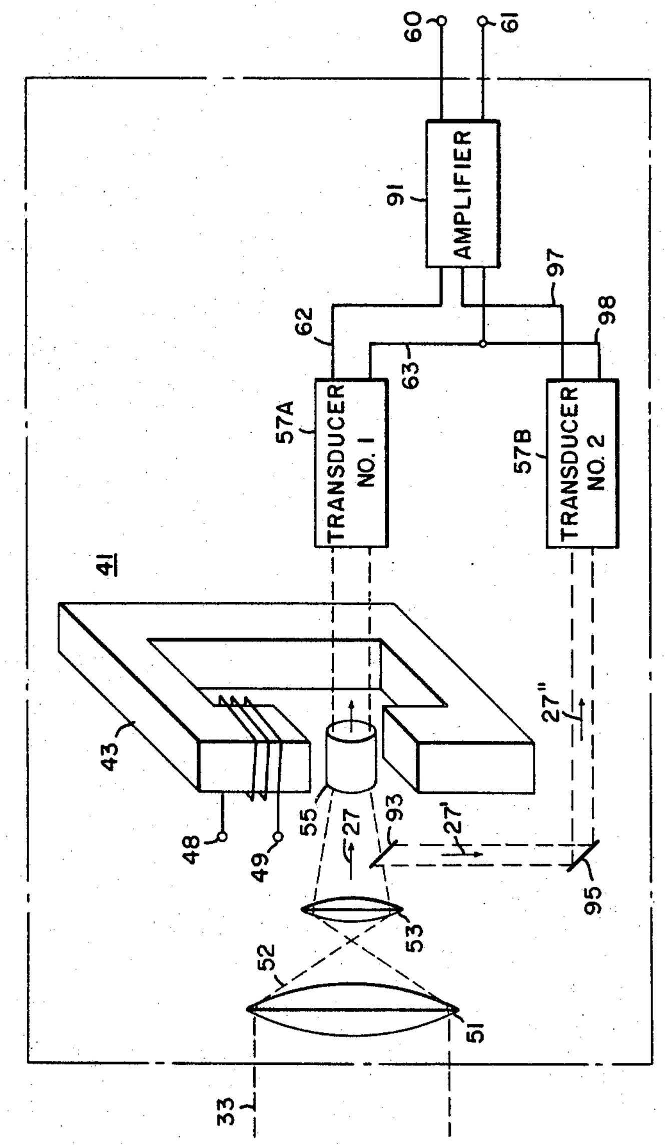
FIG. 10 is another embodiment in diagrammatic form of the receiver portion of the subject invention.

Referring to FIG. 10, an alternate embodiment of the receiver for the optical communication system is illustrated in diagrammatic form. In FIG. 10 the receiver 50 basically acts the same as the receiver 40 shown in the first embodiment, FIG. 1. In this embodiment, optical means for gathering light transmitted to it and comprising, for example, lenses 51 and 53 receives light beam 33 and sends light 27 to an absorption filter 55 from which light $\overline{27}$ emerges as intensity modulated light. This in turn is fed to a transducer 57a providing an electrical signal output on wires 62 and 63 to the amplifier 91. In addition, however, this embodiment includes an optical means including mirrors 93 and 95 which sample a portion of the light 27 and feeds it to a second transducer 57b. The light 27'' does not pass through the absorption filter but is fed directly to the transducer 57b. The transducer 57b like its counterpart 57a provides an electrical signal in accordance with the intensity of the light striking it. The electrical signal thus produced by transducer 57b is fed to amplifier 91 by means of wires 97 and 98. Amplifier 91 takes both electrical signals from transducers 57a and 57b and produces an output signal on leads 60 and 61.

Amplifier 91 is preferably of the ratio amplifier type such that the output signal provided at leads 60 and 61 is the ratio of the electrical signals produced by transducers 57a and 57b. In this way, any fluctuation of power intensity from the transmitter 20 including random noise and the like would be cancelled out. Spurious signals would thus be eliminated providing an output which is a pure function of the frequency of the received radiation.

Figure 7:
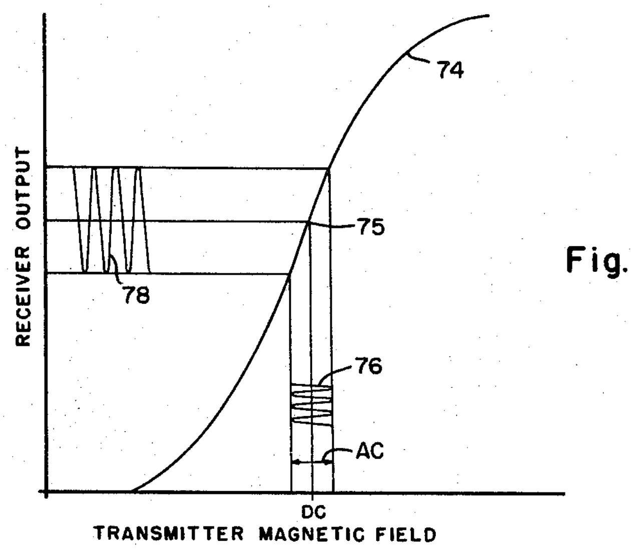
FIG. 7 is a curve illustrating the transfer function of the system comprising the present invention.

FIG. 7 is included to illustrate the transfer function of the FM optical communication system formed by the combination of the transmitter 20 and receiver 40 utilizing the optical modulator 22 and the optical demodulator 41. The system is tuned by adjusting the D.C. bias voltage to operate at a point 75 on the linear portion of the characteristic curve 74. In this manner the transmitter input signal 76 representing the intelligence to be transmitted applied thereto will be noted to present a receiver output signal 78.

Figure 8:
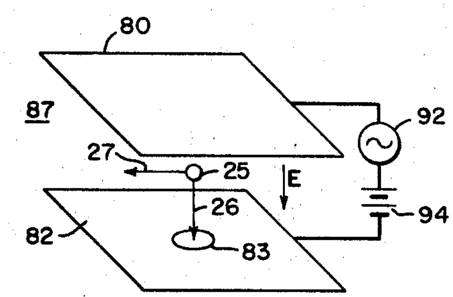
FIG. 8 is a diagrammatic view of another embodiment of an optical frequency modulator.
Figure 9:
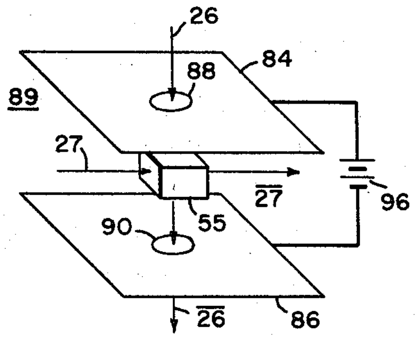
FIG. 9 is a schematic diagram illustrating another embodiment of an optical frequency demodulator.

For purposes of illustration, the embodiment of FIG. 1 has been illustrated utilizing the Zeeman effect, that is, where the optical source and absorption medium have been located in a magnetic field; however, FIGS. 8 and 9 illustrate another embodiment of the present invention wherein the optical source 25 and the absorption filter 55 are located within an electric field E. The modulator portion of the embodiment shown in FIG. 8 utilizes the Stark effect as previously noted. The intelligence input signal is generated by means of a signal source 92 in series with a steady state or D.C. supply combining to form the electric field vector E between plates 80 and 82 with light 27 being radiated transverse to the electric field and light 26 being radiated parallel or longitudinally to the electric field E through the aperture 83 in plate 82.

The demodulator as shown in FIG. 9 also utilizes the inverse Stark effect in that the absorption cell is located within an electric field E produced by the D.C. source 96 applied between the plates 84 and 86. Light emanating from the optical source 25 and radiated transverse to the electric field is received as light 27 transverse to the electric field of the demodulator 89. Likewise the light 26 radiated parallel to the electric field E of the modulator 87 is applied to the absorption cell parallel to the electric source.

In addition to the application of the subject invention for communications at ultraviolet, visible or infrared frequencies, the system disclosed further can be utilized to form the basis of search or tracking systems used in conventional or Doppler techniques and can even be used to provide a ranging system, particularly for space applications.

While there has been shown and described what are at present considered to be the preferred embodiments of the invention, modifications thereto will readily occur to those skilled in the art. It is not desired, therefore, that the invention be limited to the specific arrangements shown and described but it should be understood that changes may be made and equivalents substituted without departing from the spirit and scope of the invention.

We claim as our invention:

1. A communication system for optical frequencies where infrared, visible and ultraviolet light is used as the carrier wave comprising in combination: a transmitter producing a frequency modulated light beam and including a spectral source of predetermined atomic structure emitting a spectrum of lines, means for selecting a predetermined line of a known frequency, a first means for producing a static magnetic field encompassing said spectral source for splitting said predetermined line into a number of components that are symmetrically displaced and shifted in frequency about said predetermined line and having a polarization depending upon the relationship between an observer and the direction of said static magnetic field, a second means for producing an alternating magnetic field encompassing said source to frequency modulate said components in accordance with an input signal, and first optical means operative with said spectral source for focusing and directing said light; a second optical means for receiving light from said transmitter, an absorption filter having atoms of the same atomic structure as said spectral source responsive to optical radiation and located to be illuminated by said frequency modulated light gathered by said second optical means, a first optical-to-electrical transducer means for converting light from said absorption filter into a first electrical signal, optical means for sampling a portion of said frequency modulated light received by said second optical means, a second optical-to-electrical transducer adapted to receive said portion of the light to produce a second electrical signal, and amplifier means connected to said first and second transducer to provide an output signal.

2. A system using light as a carrier wave for transmission of information comprising, in combination: a transmitter having input means and output means and including a spectral source having an electromagnetic output of a base frequency in the infrared, visible and ultraviolet region of the spectrum, means for splitting said electromagnetic output to have at least one component at a center frequency other than said base frequency, means for modulating the frequency of said component about said center frequency in accordance with an intelligence signal applied to said input means, said output means directing said modulated component from said transmitter; a receiver operatively connected to receive said modulated component from said transmitter including demodulating means having atoms of the same atomic structure as said spectral source to absorb said component when at said center frequency but to allow passage of at least part of the component when at a frequency other than said center frequency, and means for comparing a portion of said modulated component from said transmitter to said part passing through said demodulating means for providing an output, whereby random noise and fluctuations of power intensity from the transmitter is cancelled out to provide a pure function of the frequency of said modulated component.

References Cited

UNITED STATES PATENTS

| | | | |
|---|---|---|---|
| 2,265,784 | 12/1941 | Von Baeyer. | |
| 2,531,951 | 11/1950 | Shamos et al. | 250—199 |
| 2,707,235 | 4/1955 | Townes. | |
| 2,929,922 | 3/1960 | Schawlow et al. | 325—105 |
| 3,098,112 | 7/1963 | Horton | 250—199 |
| 3,126,485 | 3/1964 | Ashkin et al. | 250—199 |

FOREIGN PATENTS

| | | |
|---|---|---|
| 608,711 | 3/1962 | Belgium. |
| 953,727 | 4/1964 | Great Britain. |

OTHER REFERENCES

Bell et al.: IRE Trans. Microwave Theory and Techniques, 1959, p. 95.

Kamal et al.: Proc. I.R.E., vol. 49, No. 8, August 1961, p. 1331.

Wood: Physical Optics, Macmillan Co., 1911, pp. 515 and 516.

Vogel et al.: Electronics, Nov. 10, 1961, pp. 81–85.

JOHN W. CALDWELL, *Acting Primary Examiner.*

DAVID G. REDINBAUGH, *Examiner.*